United States Patent
S

(10) Patent No.: US 9,615,418 B2
(45) Date of Patent: Apr. 4, 2017

(54) SEGEMENTED LIGHT GUIDE PANELS IN LIQUID CRYSTAL DISPLAYS

(71) Applicant: INTEL CORPORATION, Santa Clara, CA (US)

(72) Inventor: Arvind S, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 228 days.

(21) Appl. No.: 14/142,801

(22) Filed: Dec. 28, 2013

(65) Prior Publication Data

US 2015/0185544 A1 Jul. 2, 2015

(51) Int. Cl.
*G02F 1/1335* (2006.01)
*H05B 33/08* (2006.01)
*F21V 8/00* (2006.01)
*G09G 3/34* (2006.01)

(52) U.S. Cl.
CPC ........ *H05B 33/0845* (2013.01); *G02B 6/0078* (2013.01); *H05B 33/0827* (2013.01); *G02B 6/009* (2013.01); *G09G 3/3406* (2013.01)

(58) Field of Classification Search
CPC ......... G02F 1/133382; G02F 1/133308; G02F 2001/133314; G02B 6/0078; G02B 6/009; H05B 33/0845; G09G 3/3406
See application file for complete search history.

(56) References Cited

U.S. PATENT DOCUMENTS

| | | | | |
|---|---|---|---|---|
| 4,704,318 A | * | 11/1987 | Saito | H01C 17/065 174/258 |
| 7,632,002 B1 | * | 12/2009 | Park | G02B 6/0088 349/65 |
| 8,482,507 B2 | * | 7/2013 | Han | G09G 3/3426 345/102 |
| 2005/0230050 A1 | * | 10/2005 | Nogiwa | H05K 3/0058 156/350 |
| 2006/0274023 A1 | * | 12/2006 | Sultenfuss | G09G 3/3406 345/102 |
| 2007/0165425 A1 | * | 7/2007 | Sakamoto | G02F 1/133608 362/633 |
| 2008/0030650 A1 | * | 2/2008 | Kitagawa | G02B 6/0068 349/65 |
| 2009/0167990 A1 | * | 7/2009 | Konno | G09G 3/3426 349/65 |
| 2009/0168454 A1 | * | 7/2009 | Lee | G02B 6/0088 362/612 |
| 2011/0025942 A1 | * | 2/2011 | Lee | G02F 1/133615 349/58 |
| 2011/0164434 A1 | * | 7/2011 | Derichs | G02B 6/0011 362/612 |
| 2013/0193850 A1 | * | 8/2013 | Demuynck | F21V 23/006 315/113 |
| 2013/0300982 A1 | * | 11/2013 | Tanaka | G02B 6/0046 349/65 |

* cited by examiner

*Primary Examiner* — Hoan C Nguyen
(74) *Attorney, Agent, or Firm* — International IP Law Group, P.L.L.C.

(57) ABSTRACT

An electronic device (e.g., computing device, all-in-one computing system, stand-alone display, etc.) having a liquid crystal display (LCD) panel, and a light guide panel (LGP) having a first zone and a second zone physically segmented from each other. The electronic device includes a first light bar associated with the first zone; and a second light bar associated with the second zone. The LGP may include more than two zones.

20 Claims, 7 Drawing Sheets

400

SEGMENTED LIGHT GUIDE PANELS IN LIQUID CRYSTAL DISPLAYS

TECHNICAL FIELD

The present techniques relate generally to electronic devices having liquid-crystal displays (LCDs) and more specifically, but not exclusively, to LCDs having segmented light guide panels.

BACKGROUND

Typically, in computing systems, the display is the most power hungry component accounting for upwards of 70% or more of system power. Thus, the display may have the largest adverse impact on battery life for computing devices utilizing a battery. Further, the display may unfortunately generate significant heat, increasing the operating temperature of the display and computing device, and which can adversely lower operating efficiency and detract from the user experience.

The competitive business of consumer electronics drives manufacturers in the continuous improvement of products to increase product quality and improve user experience. Indeed, as technologies advance with television/computer displays (e.g., liquid crystal displays or LCDs) and computing devices generally including all-in-one systems, mobile devices, and other platforms, a competitive need exists to reduce power consumption and increase heat dissipation.

Increased heat dissipation of the display and computing device can improve user experience and also lower operating temperature. A lower operating temperature may advance operating efficiency and extend life of the computing device and display. Moreover, for mobile systems, a reduction in power consumption may advantageously extend battery life and/or facilitate use of a smaller battery. Relevant electronic devices may include desktop personal computers (PCs), all-in-one (AIO) computers, portable AIO (pAIO) computers, tablet devices, smartphones, laptop computers, television monitors, and the like. Further, large displays should be accommodated where desired.

In an industry distributing and selling large volumes of electronic devices, substantial step-change improvements and even small incremental improvements in product quality and user experience can result in significant economic return. Indeed, such improvements related to lower power consumption, extended battery life, greater heat dissipation, lower heat generation, extended product life, less weight and thickness, and so on, can increased economic return, market share, and brand loyalty.

DETAILED DESCRIPTION

Figure 1:
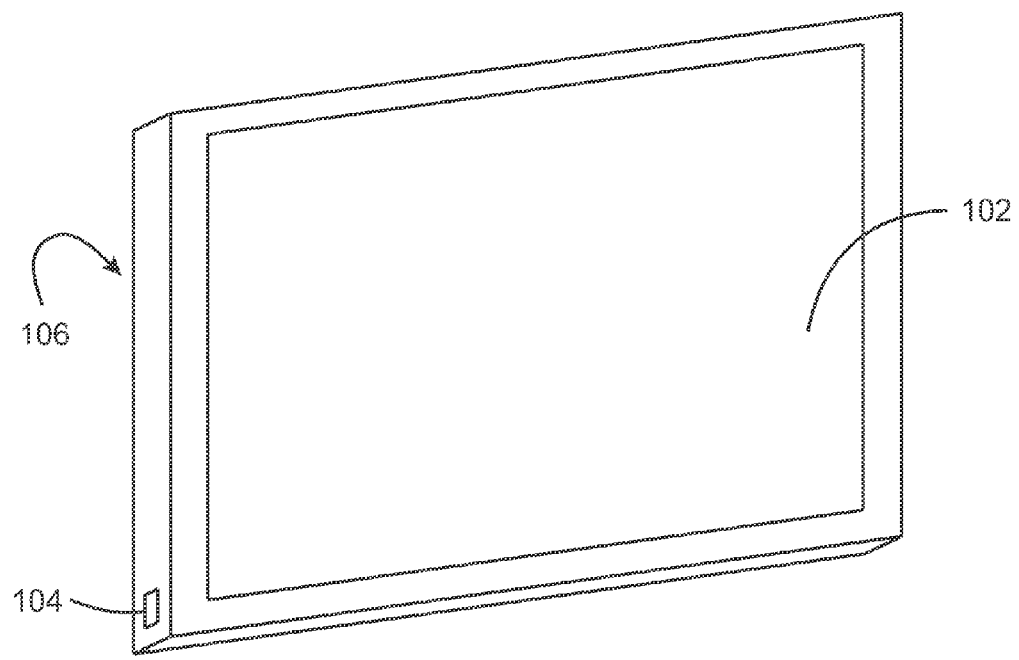
FIGS. 1 and 2 are perspective views of electronic devices having an LCD display in accordance with embodiments of the present techniques.

Embodiments of the present techniques are directed to dividing the light guide layer of a liquid crystal display (LCD) into multiple light guide panels (LGPs) or LGP zones. The LGPs or zones are segmented and physically separate so to reduce or eliminate light bleeding between the LGPs and zones. Further, each LGP or zone has a dedicated light bar and associated brightness control. Also, embodiments including coupling the printed control board (PCB) of each light bar to the LCD back cover with a thermal resin that favors thermal conductivity, and thus facilitate the back cover as a heat sink dissipate heat, i.e., to transfer heat from the LCD to ambient. Thus, LCD operating temperature (including of the light bar with PCB and light emitting diodes or LEDs) may be reduced and, therefore, operating efficiency and product life increased.

LCDs are generally lit or illuminated with a backlight module that lights the back side of the LCD. A light guide plate or light guide panel (LGP) may be a significant component of the backlight module. The light source of backlight module may be a light emitting diode (LED). Multiple LEDs may be placed in a single file called a light bar. Light from these light bar(s) illuminate the sides of the light guide panel. Light guide panels may be acrylic wave guides. In operation, light from the light bar may be in essence trapped within the light guide panel due to (total) internal reflection. However, as appreciated by the skilled artisan, surface markings disposed (e.g., substantially uniformly) of the flat upper surface of the light guide panel provide "vents" for the trapped light (to emit from the panel). This flat surface may be disposed behind the LCD open cell so that substantially all of the light from the light guide panel travels through the open cell and illuminates the LCD. As discussed below, embodiments of the present techniques uniquely provide segmented (physically separate) zones of a light guide panel.

As indicated above in the background discussion, in most computing devices, the display is the greatest consumer of power, accounting for up to 70% and greater of system power. To achieve longer battery life for computing devices employing a battery, it is thus generally beneficial to reduce power needs of the display. Indeed, in some examples, reducing the display power can increase the power efficiency of a computing device, in addition to extending battery life.

Certain power management approaches, such as with Display Power Saving Technology (DPST), have reduced backlight power for LCDs with a single backlight zone in a light guide panel (LGP). However, conventional DPST-type approaches may not produce significant power savings with multi-zone light guide panels in an LCD, or with multiple LGPs in an LCD. Thus, further improvements in power savings, including with multi-zone light guide panels or multiple LGPs in an LCD, are accommodated herein. Also, as discussed below, the configuration and packaging of the LGP and associated backlight module can beneficially lead to thinner and lighter computer systems, in addition to facilitating lower battery use and increasing operating efficiency.

Displays generally, and larger-size displays particularly, may typically benefit from relatively higher backlight power, such backlight focused at times on a narrow strip, for example, but which can unfortunately lead to thermally poor performance having an adverse effect on overall backlight life. Moreover, with systems becoming thinner, the overall display stack may also be adversely affected, not only the backlight module. In all, better packaging of the backlight module may be beneficial to reduce the overall thickness of the panel and hence the system. The backlight module may include light bar having lights and printed control boards (PCBs). The lights may be light emitting diodes (LEDs), for example.

Again, many LCDs may be illuminated or "lit" using a backlight module that lights up the back surface of the LCD, and with the light source for the backlight module generally being LED in certain embodiments. In examples, multiple LEDs are placed in a single file called a light bar which illuminates the light guide panel (e.g., acrylic wave guides). In operation, light from the light bar is "trapped" within the panel due to (total) internal reflection. Surface markings placed uniformly on the flat surface of the light guide panel provide "vents" for the trapped light. The substantially flat surface may be located behind the LCD open cell so that considerably all of the light from the light guide panel goes through the open cell and illuminates the LCD.

The aforementioned DPST technology and similar technologies may aim to adaptively reduce backlight brightness while maintaining satisfactory visual performance. For instance, a DPST subsystem may analyze the image to be displayed and use a set of algorithms to change the chroma value of pixels while reducing the brightness of backlight simultaneously such that there is a reduced perceived visual degradation. When the frame to be projected and the frame being projected have a considerable difference, a software interrupt may be asserted and new chroma values for pixels and brightness values calculated. However, such applications have generally been for the entire LCD as a single zone. Yet, as discussed below in accordance with embodiments of the present techniques, the display is split into multiple zones beneficially giving higher power reduction numbers relatively smoother control, with the power management techniques such as DPST adjusted.

In embodiments, an entire LGP is split into multiple LGPs with physical separation. Consequently, the typical entire LGP is divided into independent contained light wave guides with reduce light bleed problem. The DPST multi-zone issue is also addressed. Each zone is lit with a dedicated LGP with its own light bar and pulse width modulation (PWM) control signal. Thus, the whole panel may be divided into multiple zones (2, 3, 4, 6, etc.) and each zone having its own light source and acting as a separate LGP. Boundaries between the LGPs act as physical barrier containing light and improving overall black light (BL) efficiency as light loss may be very low.

Light bar mounting may be important for efficiency and life. LEDs are generally mounted on a PCB or a Metal Core PCB (MCPCB) for better thermal performance. Many MCPCBs consist of an aluminum core with thermal resin mounted copper foil, for example, on which LEDs are mounted. However, instead of using a MCPCB and FR4, flexible PCB with direct bonding to back cover may be implemented. This may lead to higher efficiency, higher life, lower cost and lower weight of the overall solution. In some examples, the flexible PCB can include copper foils separated by a resin. Further, in certain embodiments, this flexible PCB is directly bonded to an aluminum back cover using thermal resin. Such can lead to a lower cost as flexible PCB tend to be less expensive than MCPCB, and has better thermal performance than MCPCB which can lead to a lower LED temperature for large heat sink areas. In some examples, flexible PCB can also result in lower thermal difference on an LCD display (e.g., less hot spots on the LED). In some examples, the flexible PCB includes a smaller thickness than MCPCB and lower weight.

The embodiments described herein can reduce or eliminate zone boundary bleeding and enables multi-zone DPST (or other power-saving and brightness algorithms) implementation from hardware, firmware, and software. In some examples, software applications can be used to provide instructions that operate the multiple light bars corresponding to each zone using algorithms, such as DPST algorithms or other algorithms.

Figure 2:
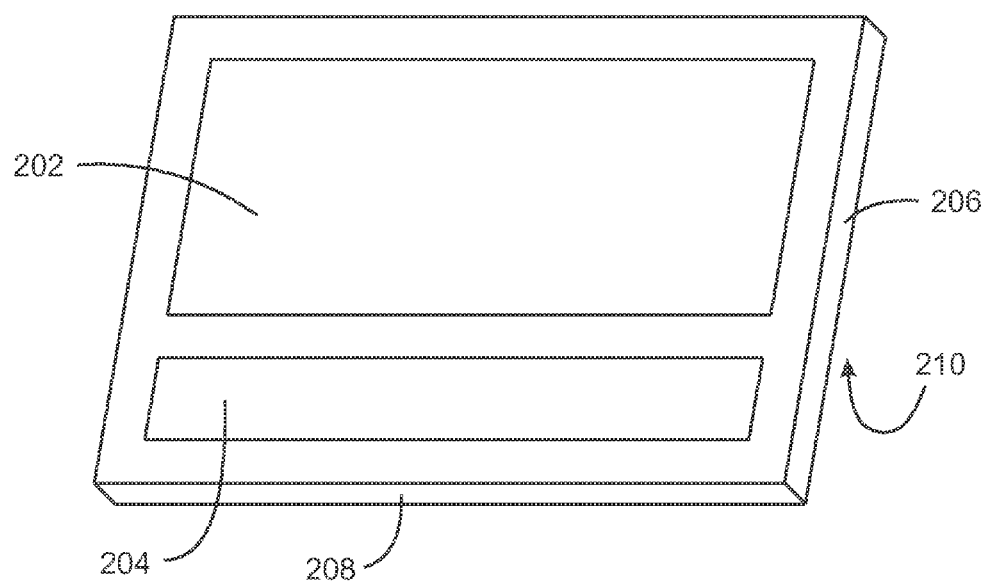

FIGS. 1 and 2 are examples of electronic devices having a liquid crystal display (LCD). The LCD may have a light guide panel (not shown) with multiple segregated zones, or in another characterization, a light guide layer with multiple adjacent light guide panels. Such may reduce bleeding of light within the LCD, as well as improve power management control, as discussed below.

FIG. 1 is an electronic device 100 that may be a standalone LCD (e.g., to be employed with a computing or television system). The device 100 may instead be a computing device having an LCD, such as an AIO system, mobile or portable device, and so forth. In other examples, the electronic device 100 may instead be an LCD television. The electronic device 100 may generally have buttons or controls, which may be physical or virtual. The display or display screen of the LCD is indicated with the reference numeral 102. The electronic device 100 may have one or more connection ports 104, the format depending on the application. Lastly, the back 106 of the device 100 may be a back panel uniquely configured to dissipate heat. Embodiments of such back panels in a LCD as a heat dissipation component are discussed below.

FIG. 2 is a computing device 200, such as an AIO system or mobile device, having an LCD display 202. Optionally, the computing device 200 may have an accompanying or integrated speaker(s) 204. A side and width dimension of the computing device 200 is indicated by the reference numeral 206. The bottom (and width dimension) of the computing device 200 is indicated by the reference numeral 208. Lastly, the arrow 210 points to the back of the computing device 200, which may include a LCD back panel configured as a heat dissipation component. As discussed below, embodiments provide for a LCD back panel coupled to the internal LCD backlight module via a thermally conductive (low resistance) material or adhesive. Thus, heat generated by the backlight module may be beneficially dissipated via the back panel (e.g., aluminum).

Figure 3:
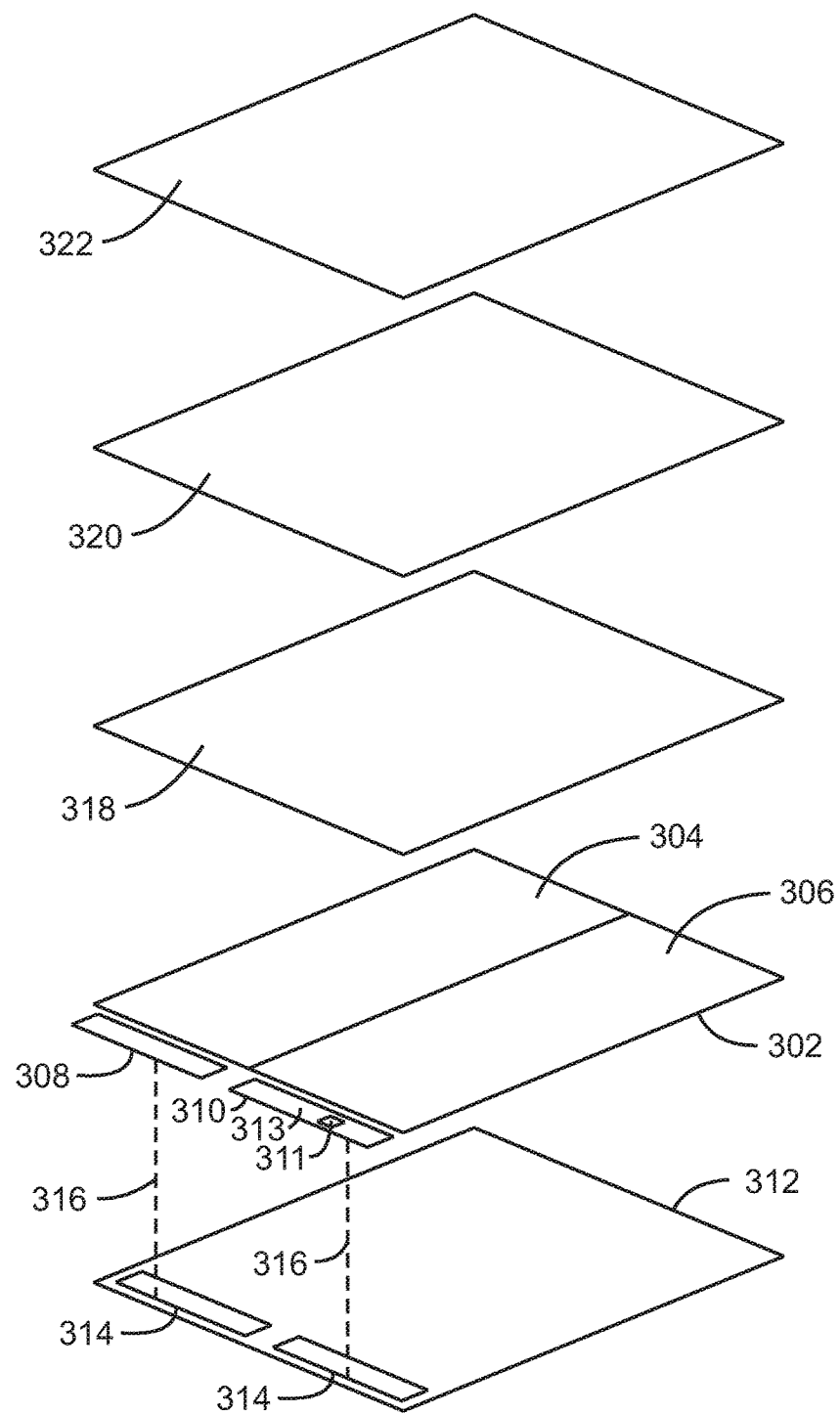
FIG. 3 is an exploded view of an LCD depicting layers of the LCD in accordance with embodiments of the present techniques.

FIG. 3 is an exploded view of some layers of an LCD 300 that might be employed in the respective devices 100 and 200 of FIGS. 1 and 2, or in other devices and systems. For clarity, not all of the layers of the LCD 300 are depicted. One layer depicted is a light guide panel 302 having segmented zones 304 and 306 (physically separate). In the illustrated embodiment, each zone 304 and 306 has an associated independent respective light bar 308 and 310. The light bars 308 and 310 may include LEDs 311 that project (shine) light into the side of the respective LGP zones 304 and 306. Once inside the LGP 302, the light may "vent" from the LGP 302 upward (toward the front) of the LCD 300. In alternate embodiments, LEDs may be positioned below (behind) the light guide panel and direct light upward to the back surface of and into the light guide panel.

In all, the LGP 302 configuration with multiple zones may reduce light bleeding, as compared to a conventional contiguous LGP without physically separate zones. Further, control logic may beneficially account for power management (e.g., Intel® DPST) with the segmented zones 304 and 306 of the light guide panel 302. It should be noted that the light guide panel 302 may be characterized as a light guide layer, with the zones 304 and 306 as two separate LGPs associated their respective light bars 308 and 310.

Moreover, zones 304 and 306 may instead be arranged one on each side of the LGP 302, and a light bar 308 and 310 on the respective side. Further, the light guide panel 302 may be segmented into more than two zones (e.g., three zones, four zones, etc.), and each with a dedicated light bar. In the case of four zones, for example, two light bars may be disposed on one side, and two light bars disposed on the other side.

The light bars 308 and 310 may each include a printed circuit board (PCB) 313 supporting the LEDs 311. The PCBs may be a metal core PCB (MCPCB), or uniquely a flexible PCB (e.g., having copper foils separated by a resin) which may lead to lower costs and better heat dissipation as compared to a MCPCB. In certain instances, the flexible PCB can also result in lower thermal difference on the display (e.g., less hot spots on the LED). In some examples, the flexible PCB is advantageously thinner and lower in weight to a comparable MCPCB. Further, in the illustrated embodiment, a thermal resin or adhesive 314 may be disposed between the back panel 312 and the LGP 302 to couple (as represented by dashed lines 316) the light bars 308 and 310 to the back panel 312. Thus, instead of using a typical MCPCB with FR4 laminate, for instance, a flexible PCB with direct bonding via a thermal resin to the back cover 312 may be implemented, leading to higher efficiency, higher life, lower cost, and lower weight of the LCD 300 including its backlight module with light bars 308 and 310.

The LCD 300 includes an LCD panel 318 which may have a thin film transistor (TFT) glass. In this example, the LCD 300 toward the front further includes an optional touch sensor layer 320, e.g., a capacitive touch panel (CTP), and a display cover 322, e.g., glass or polymethylmethacrylate (PMMA). Additional layers disposed between the depicted layers may include adhesive, optical clear resin (OCR), color filter, conducting film glass, polarizers, brightness enhancement film (BFE) including dual BFE (DBFE), diffuser (e.g., above or in front of the LGP 302), reflector (e.g., below or behind the LGP 302), an air gap layer, and so on.

Figure 4:
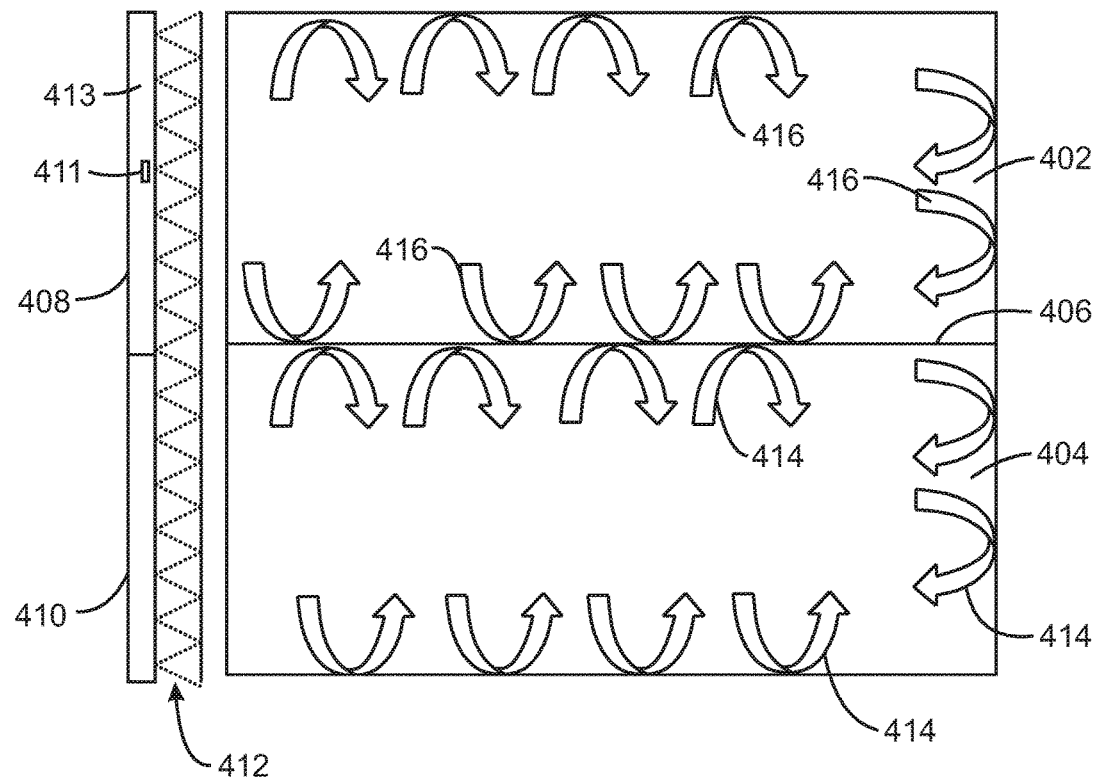
FIG. 4 is a diagrammatical representation of a sectional view of a light guide panel in accordance with embodiments of the present techniques.

FIG. 4 is a light guide panel 400 which may be similar to the LGP 300 of FIG. 3. The LGP 400 has two zones 402 and 404 segmented (physically separate) from one another, e.g., having a divider or barrier 406 between and separating the two zones 402 and 404. Thus, beneficially, light bleeding between the zones may be reduced. The zones 402 and 404 may be labeled themselves as dedicated LGPs and, thus, LGP 400 characterized as two LGPs 402 and 404.

The LGP 400 includes light bars 408 and 410 dedicated respectively to the LGP zones (or LGPs) 402 and 404. Light is emitted from the LEDs 411 on the light bar and directed toward the side of the LGP 400, as indicated by reference numeral 412. Once inside, the light internally reflects, as indicated by the arrows 414 and 416. Notably, the internal reflection 414 of the LGP zone 404 is separate from the internal reflection 416 of the other LGP 402. Lastly, the internally reflected and distributed light "trapped" in the zones 402 and 404 ultimately discharges or "vents" (not shown) from the upper or front surface of the LGP 400 toward the LCD panel toward the front of the LCD. Also notably, with the DPST control (e.g., in strategic dimming of the LEDs) or similar control, the lights bars 408 and 410 (having the LEDS 411 and associated PCB 413) may each have independent or dedicated DPST control (e.g., pulse width modulation or PWM for brightness control) directed to their respective PCB 413/LEDs 411 and associated LGP zone 402 or 404.

It should be pointed out that for configuration of zones adversely with no physical separation, post interior reflection will cause light bleeding from one zone to another, even though the far IR (FIR) light may tend to follow straight lines. When a first zone is dimmed, light from the second zone will enter and illuminate pixels belonging to first zone along the border. This may lead to local blooming and potentially rending the displayed image of low quality, or even incoherent or useless.

Conversely, with embodiments of the present techniques, a solution to such a bleeding problem is the segmented multi zone LGP 400. Each zone 402 and 404 lit as a dedicated LGP with its own respective light bar 408 and 410, and with its own pulse with modulation (PWM) control signal for LED dimming. As in the illustrated embodiment of FIG. 4, the entire panel is 400 may be divided into multiple zones (two zones 402 and 404 shown here), and each zone has its own light source and LGP. Boundaries between the LGPs act as physical barrier containing light and improving overall black light (BL) efficiency as light loss may be very low.

Figure 5:
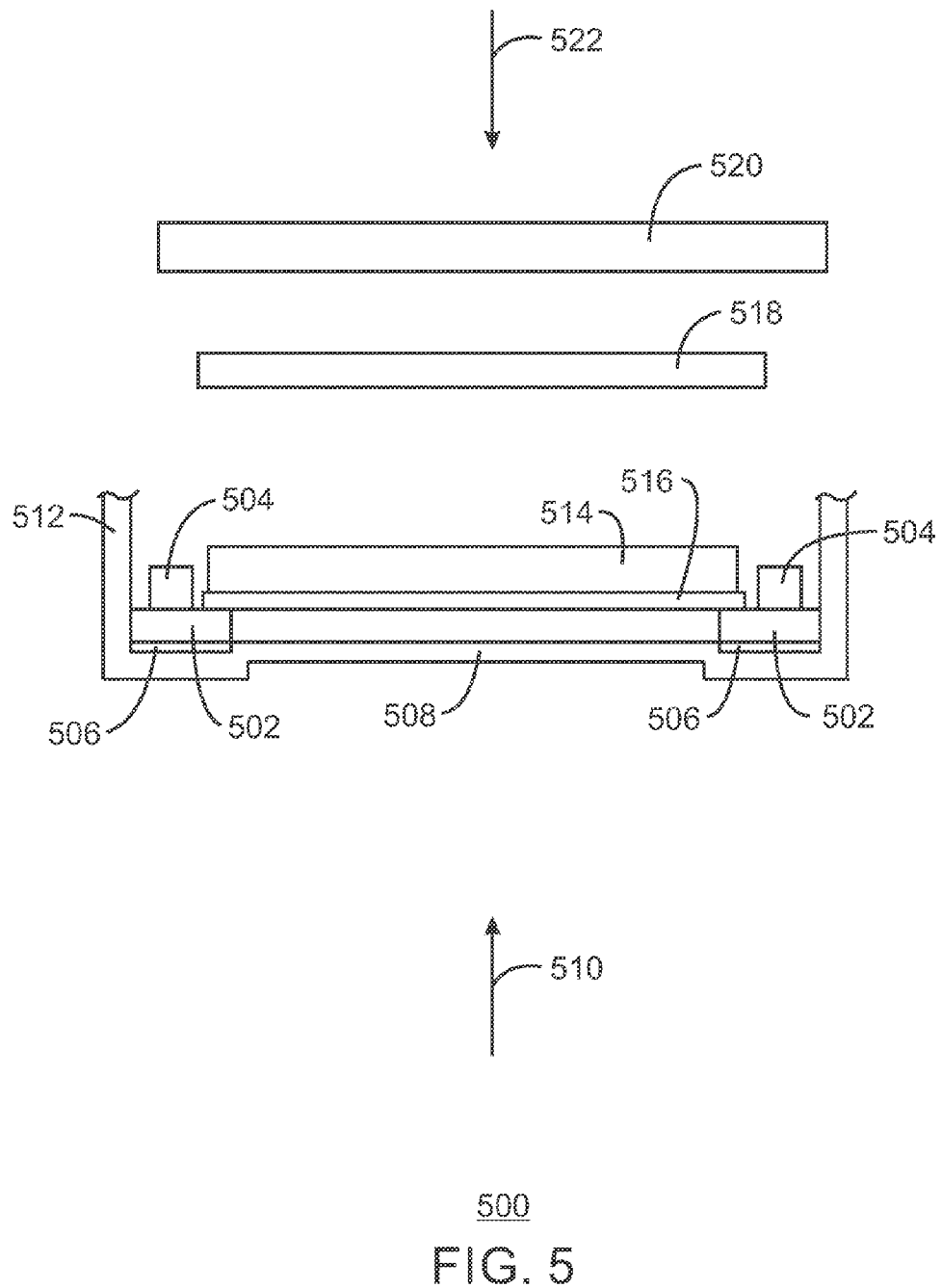
FIG. 5 is section view of some components and layers of an LCD in accordance with embodiments of the present techniques.

FIG. 5 is a cross section (can be top, bottom, or side) of some components of an LCD 500. The depicted components indicate a focus on improved heat dissipation out the back of the LCD. Indeed, FIG. 5 shows a beneficial configuration of PCBs 502 (e.g., flexible PCBs) supporting LEDs 504, and with thermal resin 506 coupling the PCBs 502 to a thermally conductive (e.g., aluminum) back plate 508 (back cover) that dissipates heat from the LCD 500 to the environment. The LCD 500 may be similar to the LCD 300 and 400 of the preceding figures, and/or to other LCD embodiments discussed herein. Many components of the LCD 500 are not depicted for clarity.

As indicated, the LCD 500 includes PCBs 502, LEDs 504, thermal resin 506 (i.e., low thermal resistance), and the back panel or back cover 508. In the illustrated embodiment, the back cover 508 from the LCD back 510 extends around to transition to a frame or chassis 512 of the LCD 500. Of course, the structural configuration may include additional structure and alternative configurations.

The LEDs 504 emit light into the light guide panel 514. As with the light guide panels 302 and 400 of the preceding figures, the LGP 514 may have two or more zones (i.e., two or more LGPs) that are dedicated and physically separate. In this example of FIG. 5, it is contemplated that the LGP 514 has four zones (or four dedicated LGPs) with four respective light bars (each having a PCB 502 and LEDs 504), with two light bars disposed on each side of the LGP 514. A reflector 516 may be disposed below the LGP 514. Lastly, an optional touch sensor 520 (e.g., a capacitive touch panel) is depicted toward the front 522 if the LCD. Of course, the LCD includes several additional layers and components, and one of which may be a display cover disposed further in front of the touch sensor 520, for example.

Figure 6:
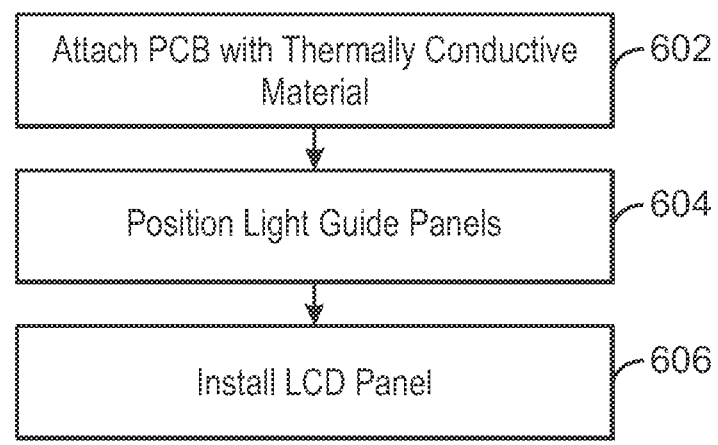
FIG. 6 is block flow diagram of a method of assembling an LCD in accordance with embodiments of the present techniques.

FIG. 6 is a method 600 of assembling an LCD. A printed circuit control board (PCB) supporting LEDs for a LGP(s) is attached (block 602) to the LCD back cover via a thermally conductive resin or material. Thus, for a back cover of aluminum or other thermally conductive material, the back cover may beneficially act as a heat sink when the LCD in operation to transfer heat from the LCD to the environment. Such heat transfer may lower LCD operating temperature, and thus increase efficiency and life of the LCD and its components. Moreover, local hot spots on the back cover may be reduced, improving user experience.

Light guide panels are positioned (block 604) to receive light from the LEDs. More than one light guide panel (or also called a LGP zone) is employed in the same light guide layer and are physically separated (barrier) to reduce or eliminate light bleeding between the LGPs. Lastly, an LCD panel is installed (606). Of course, additional actions may be performed in assembling the LCD.

Figure 7:
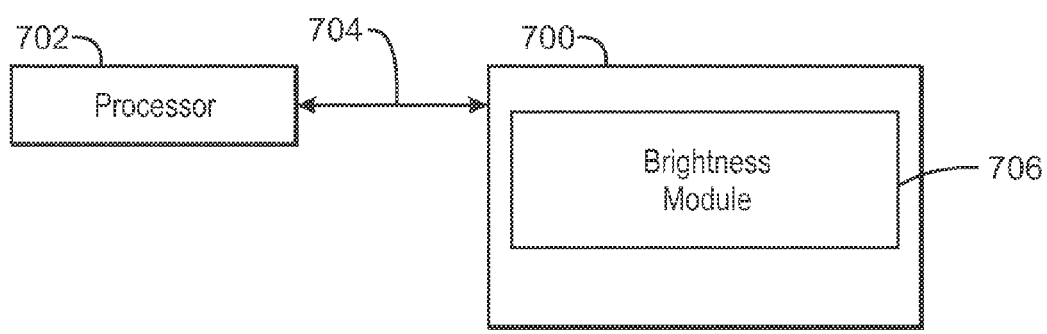
FIG. 7 is a block diagram of an example tangible, non-transitory computer-readable medium to implement embodiments of the present techniques.

FIG. 7 is a block diagram depicting an example of a tangible, non-transitory computer-readable medium that can manage light bar (LED) brightness and dimming with control algorithms (e.g., as with DPST) and PCBs in a computing system or LCD. The tangible, non-transitory, computer-readable medium 700 may be accessed by a processor 702 over a computer interconnect 704. Furthermore, the tangible, non-transitory, computer-readable medium 700 may include code to direct the processor 702 to perform the operations of the techniques described above.

The various software components discussed herein may be stored on the tangible, non-transitory, computer-readable medium 700, as indicated in FIG. 7. For example, a brightness module 406 may facilitate control of LED dimming for a light bar and associated dedicated LGP. Further, the brightness module may account for separate and independent pulse width modulation for the LED brightness and dimming for independent light bars and associated separated LGPs or LGP zones. It is to be understood that any number of additional software components not shown in FIG. 7 may be included within the tangible, non-transitory, computer-readable medium 700, depending on the specific application.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

Example 1

Embodiments include an electronic device (e.g., computing device, AIO, stand-alone LCD, etc.) comprising: a liquid crystal display (LCD) panel; a light guide panel (LGP) having a first zone and a second zone physically segmented from each other; a first light bar associated with the first zone; and a second light bar associated with the second zone. The LGP may include more than two zones. The electronic device may include a processor, and a memory having control logic stored therein and executable by the processor to implement a first brightness control of the first light bar and a second brightness control of the second light bar, wherein the first brightness control is independent of the second brightness control. In certain embodiments, the first brightness control comprises a first pulse width modulation (PWM) of a first set of light emitting diodes (LEDs), and wherein the second brightness control comprises a second PWM of a second set of LEDs. The first light bar may include a first PCB and a first set of LEDs, and the second light bar may include a second PCB and a second set of LEDs. The first and second PCBs each may be a flexible PCB. Moreover, in some embodiments, the first PCB is not a metal core PCB (MCPCB), and the second PCB is not a MCPCB. Further, the first and second light bars may each be coupled to a back cover (e.g., aluminum) via a thermal resin to facilitate thermal conduction from the first and second light bars to the back cover.

Example 2

Other embodiments include a method of assembling a liquid crystal display (LCD), the method comprising: attaching a first printed circuit board (PCB) of a first light bar to a back cover (e.g., of aluminum) of the LCD with a thermal resin to facilitate heat transfer from the first light bar to the back cover; attaching a first second PCB of a second light bar to the back cover with the thermal resin to facilitate heat transfer from the second light bar to the back cover; positioning a first light guide panel (LGP) to receive light from the first light bar; positioning a second LGP to receive light from the second light bar, wherein the first LGP and second LGP are installed in a same layer of the LCD but are physically segmented from one another; and installing an LCD panel. In particular examples, the first light bar has a first set of light emitting diodes (LEDs), and the second light bar has a second set of LEDs. The method may include configuring memory of the LCD to store control logic code executable by a processor to implement a first brightness control of the first light bar and a second brightness control of the second light bar, wherein the first brightness control is independent of the second brightness control. Further, the first brightness control may include a first pulse width modulation (PWM) of a first set of LEDs associated with the first PCB, and wherein the second brightness control may include a second PWM of a second set of LEDs associated with the second PCB. In certain embodiments, the first and second PCBs each are a flexible PCB, and/or are not a MCPCB.

Example 3

Embodiments may include a non-transitory, computer-readable medium having instructions that, in response to being executed on a processor, cause the processor to implement a first brightness control of a first light bar of a LCD, and to implement a second brightness control of a second light bar of the LCD, wherein the first brightness control is independent of the second brightness control. In certain instance, the first brightness control comprises a first pulse width modulation (PWM) of a first set of light emitting diodes (LEDs) of the first light bar, and wherein the second brightness control comprises a second PWM of a second set of LEDs of the second light bar. Lastly, the first light bar may direct light to a first zone of a light guide panel (LGP) of the LCD, and the second light bar may direct light to a second zone of the LGP, and wherein the first zone is physically separated from the second zone via a barrier.

What is claimed is:

1. An electronic device comprising:
   a liquid crystal display (LCD) panel;
   a light guide panel (LGP) comprising a first zone and a second zone physically segmented from the first zone via a physical barrier that contains light and reduces light bleeding between the first zone and the second zone;
   a first light bar associated with the first zone but not the second zone;
   a second light bar associated with the second zone but not the first zone, wherein the first light bar comprises a first flexible printed control board (PCB) and a first set of LEDs, and the second light bar comprises a second flexible PCB and a second set of LEDs, wherein the first flexible PCB is not a metal core PCB (MCPCB), and the second flexible PCB is not a MCPCB;
   a back cover as a heat sink, wherein the back cover comprises an exterior surface of the electronic device, wherein the back cover extends around to sides of the electronic device as a chassis of the electronic device, and wherein the first and second light bars are each coupled to the back cover via a thermal resin adhesive to facilitate thermal conduction from the first and second light bars to the back cover; and
   a memory having control logic stored therein and executable by a processor to implement a first brightness control of the first light bar and a second brightness control of the second light bar, wherein the first brightness control is independent of the second brightness control.

2. The electronic device of claim 1, wherein the electronic device comprises a stand-alone LCD.

3. The electronic device of claim 1, wherein the electronic device comprises a computing device having a LCD.

4. The electronic device of claim 3, wherein the computing device comprises an all-in-one (AIO) computing device.

5. The electronic device of claim 1, comprising the processor.

6. The electronic device of claim 1, comprising:
   a reflector disposed between the light guide panel and the back cover; and
   a touch sensor comprising a capacitive touch panel, wherein the first brightness control comprises a first pulse width modulation (PWM) of the first set of light emitting diodes (LEDs), and wherein the second brightness control comprises a second PWM of the second set of LEDs independent of the first PWM.

7. The electronic device of claim 1, wherein the back cover comprises aluminum.

8. The electronic device of claim 1, wherein the first brightness control comprises dimming of the first set of LEDs, and wherein the second brightness control comprises dimming of the second set of LEDs.

9. The electronic device of claim 1, wherein the control logic accommodates Display Power Saving Technology (DPST) applied independently to the first light bar and the second light bar, respectively.

10. The electronic device of claim 1, wherein the back cover comprises metal.

11. The electronic device of claim 1, wherein the first and second light bars are each directly bonded to the back cover, and wherein the back cover is thermally conductive and to dissipate heat to the environment.

12. The electronic device of claim 1, wherein the first and second light bars are each directly bonded to the back cover via the thermal resin adhesive.

13. The electronic device of claim 1, wherein the first flexible PCB and the second flexible PCB each comprise copper foils separated by a resin.

14. A non-transitory, computer-readable medium comprising instructions that, in response to being executed on a processor, cause the processor to:
   implement a first brightness control of a first light bar of a LCD panel of an electronic device, the first light bar associated with a first zone of a light guide panel (LGP), wherein the first light bar comprises a first flexible printed control board (PCB) and a first set of light emitting diodes (LEDs); and
   implement a second brightness control of a second light bar of the LCD panel, the second light bar associated with a second zone of the LGP but not the first zone, wherein the first brightness control is independent of the second brightness control, wherein the first zone is physically separated from the second zone via a physical barrier that contains light and reduces light bleeding between the first zone and the second zone, wherein the second light bar comprises a second flexible PCB and a second set of LEDs, wherein a back panel of the electronic device is a heat sink, the back panel comprising an external surface, wherein the back panel extends around to sides of the electronic device as a chassis of the electronic device, and wherein the first and second light bars are each coupled to the back panel via a thermal resin adhesive to facilitate thermal conduction from the first and second light bars to the back panel.

15. The non-transitory, computer-readable medium of claim 14, wherein the first brightness control comprises a first pulse width modulation (PWM) of the first set of light emitting diodes (LEDs) of the first light bar, and wherein the second brightness control comprises a second PWM of the second set of LEDs of the second light bar.

16. The non-transitory, computer-readable medium of claim 14, wherein the first light bar directs light to the first zone of the LGP, and the second light bar directs light to the second zone of the LGP.

17. The non-transitory, computer-readable medium of claim 15, wherein the first brightness control comprises dimming of the first set of LEDs, and wherein the second brightness control comprises dimming of the second set of LEDs.

18. The non-transitory, computer-readable medium of claim 14, wherein the first brightness control and second brightness control each accommodate Display Power Saving Technology (DPST) applied independently to the first light bar and the second light bar, respectively.

19. The non-transitory, computer-readable medium of claim 14, wherein the first flexible PCB is not a metal core PCB (MCPCB), and the second flexible PCB is not a MCPCB, wherein the first flexible PCB and the second flexible PCB each comprise copper foils separated by a resin, and wherein the back panel is thermally conductive.

20. The non-transitory, computer-readable medium of claim 14, wherein the first and second light bars are each directly bonded to the back panel via the thermal resin adhesive, and wherein the back panel to dissipate heat to the environment.

* * * * *